US006631778B2

(12) United States Patent
Mallette

(10) Patent No.: US 6,631,778 B2
(45) Date of Patent: Oct. 14, 2003

(54) SHOCK LINKAGE ASSEMBLY FOR A SNOWMOBILE SUSPENSION SYSTEM

(75) Inventor: Bertrand Mallette, Rock-Forest (CA)

(73) Assignee: Bombardier Inc., Valcourt (CA)

( * ) Notice: Subject to any disclaimer, the term of this patent is extended or adjusted under 35 U.S.C. 154(b) by 60 days.

(21) Appl. No.: 09/778,801

(22) Filed: Feb. 8, 2001

(65) Prior Publication Data

US 2001/0023787 A1 Sep. 27, 2001

Related U.S. Application Data

(60) Provisional application No. 60/181,231, filed on Feb. 9, 2000.

(51) Int. Cl.[7] .............................................. B62M 27/02
(52) U.S. Cl. ..................... 180/193; 180/9.25; 180/9.28; 180/182; 180/186
(58) Field of Search ................................ 180/9.25, 9.28, 180/182, 184, 186, 190, 193

(56) References Cited

U.S. PATENT DOCUMENTS

| 5,265,692 A | | 11/1993 | Mallette ..................... 180/193 |
| 5,664,649 A | | 9/1997 | Thompson et al. ......... 188/314 |
| 5,692,579 A | | 12/1997 | Peppel et al. ............. 180/190 |
| 5,727,643 A | * | 3/1998 | Kawano et al. ............ 180/193 |
| 5,791,429 A | * | 8/1998 | Bergman .................... 180/193 |
| 5,860,486 A | * | 1/1999 | Boivin et al. ............... 180/193 |
| 5,904,216 A | * | 5/1999 | Furusawa .................... 180/193 |
| 5,947,217 A | * | 9/1999 | Snare et al. ................ 180/9.56 |
| 6,234,264 B1 | * | 5/2001 | Boivin et al. ............... 180/193 |
| 6,237,706 B1 | * | 5/2001 | Karpik et al. .............. 180/9.52 |
| 6,253,867 B1 | * | 7/2001 | Lillbacka .................... 180/193 |
| 6,263,991 B1 | * | 7/2001 | Savage et al. ............. 180/190 |
| 6,283,241 B1 | * | 9/2001 | Kubota ........................ 180/193 |
| 6,302,232 B1 | * | 10/2001 | Forbes ........................ 180/193 |

* cited by examiner

*Primary Examiner*—Lesley D. Morris
*Assistant Examiner*—L. Lum
(74) *Attorney, Agent, or Firm*—Pillsbury Winthrop LLP

(57) ABSTRACT

The present invention provides a snowmobile suspension system comprising a slide frame for engagement with an endless track, a suspension arm, a bracket arm, and a rocker arm. The suspension arm has an upper portion adapted to be pivotally mounted relative to a chassis on a snowmobile and a lower portion adapted to be pivotally mounted relative to the slide frame. The bracket arm has an end fixedly connected to the lower portion of the suspension arm. The rocker arm has an upper end pivotally connected to the other end of the bracket arm and a lower end supporting a lower end of a shock absorber, the lower end of said shock absorber being pivotally attached thereto. The upper end of the shock absorber is pivotally interconnected to the chassis. The rocker arm is constructed and arranged such that a lower end thereof is disposed beneath the lower portion of the suspension arm.

16 Claims, 5 Drawing Sheets

SHOCK LINKAGE ASSEMBLY FOR A SNOWMOBILE SUSPENSION SYSTEM

The present application claims priority to U.S. Provisional Application of Mallette, filed Feb. 9, 2000, Ser. No. 60/181,231, the entirety of which is hereby incorporated into the present application by reference.

FIELD OF THE INVENTION

This invention relates to a rear shock linkage system for a suspension system of a snowmobile.

BACKGROUND OF THE INVENTION

Tracked vehicles such as snowmobiles have rear suspensions generally consisting of front and rear suspension arms pivotally mounted on shafts, which are rotatably connected to a slide frame. The slide frame comprises a pair of laterally spaced apart slide rails or longitudinal skids interconnected transversely on opposing lateral sides of the snowmobile. The slide rails are in sliding contact with an endless track which contacts the snow surface and drives the snowmobile. The front and rear suspension arms pivotally interconnect the chassis of the snowmobile to the slide frame.

In many current arrangements, front and rear suspension arms pivotally interconnect the chassis to the slide frame. In one typical arrangement, the rear suspension system includes a pair of shock absorbers pivotally interconnected to the chassis, extending downward to a transverse tube that is pivotally mounted relative to the slide frame by connecting parts. Also, to attach the rear shock absorber to the transverse tube, the conventional approach is to pivotally mount the shock absorber to a bracket arm that, in turn, is fixedly attached to the transverse tube. Such a system is shown in U.S. Pat. No. 5,664,649 to Thompson et al., with the above-mentioned bracket arm designated as element 90.

In the above arrangement, it is preferable to make the bracket arm as short as possible so that the shock absorber is attached at the lowest possible point to thereby provide greater suspension travel within the confines defined by the endless track. However, a short bracket arm length creates the possibility that the shock absorber will become jammed with other suspension components and/or belt during large angular displacements of the pivoting shaft, and, correspondingly, the bracket arm. Therefore, a short bracket arm length limits flexibility in the design of the suspension linkage system.

One way to alleviate the concerns over the restriction on the design options and also provide for sufficient shock absorber travel is to attach the shock absorber to an end of an additional component that permits a higher or lower pivoting point for the additional component. Such a prior art system is shown in FIG. 1. Here, shock absorber 1 is attached to a rocker arm 2, which is pivotally attached via a bolt 3 to an additional component designated as plate bracket 4. Plate bracket 4 is in turn fixed to transverse tube 5, which is fixed to the slide frame. Thus, rocker arm 2 pivots about plate bracket 4 via bolt 3. Because of the large forces experienced by the system, plate bracket 4 and rocker arm 2 require additional support. To provide such support, plate bracket 4 includes a C-shaped portion 6, which is more clearly shown in the exploded view in FIG. 2. This C-shaped portion 6 is in sliding contact with transverse portion 8 of front suspension arm 7. Thus, plate bracket 4 is supported at both ends for additional strength. As can be seen from FIG. 1, shock absorber 1 is thus attached to a low position that allows for sufficient suspension travel. Because rocker arm 2 is long and can pivot freely about pivot 3, the concerns about the restrictions in the suspension linkage system are reduced.

However, the prior art apparatus shown in FIG. 1 has three problems. First, the added components of the plate bracket 4 and support tube 5 add weight. Second, the forces involved combined with the friction between the C-shaped portion 6 and transverse portion 8 create significant wear of both the transverse portion 8 and the C-shaped portion 6. Third, because of the forces between the C-shaped portion 6 and the transverse portion 8, "stiction" occurs between the two components, preventing free movement of the front suspension arm and thereby reducing the overall performance of the suspension system.

SUMMARY OF THE INVENTION

It is an object of the present invention, therefore, to overcome the problems associated with the prior art noted above. In achieving this object, the present invention provides a snowmobile suspension system comprising a slide frame for engagement an endless track, a suspension arm, a bracket arm, and a rocker arm. The suspension arm has an upper portion adapted to be pivotally mounted relative to a chassis on a snowmobile and a lower portion adapted to be pivotally mounted relative to the slide frame. The bracket arm has an end fixedly connected to the lower portion of said suspension arm. The rocker arm has an upper end pivotally connected to the other end of the bracket arm and a lower end supporting a lower end of a shock absorber, the lower end of the shock absorber being pivotally attached thereto. The upper end of the shock absorber is pivotally interconnected to the chassis.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

While the present invention will hereinafter be described in connection with at least one exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

Figure 1:
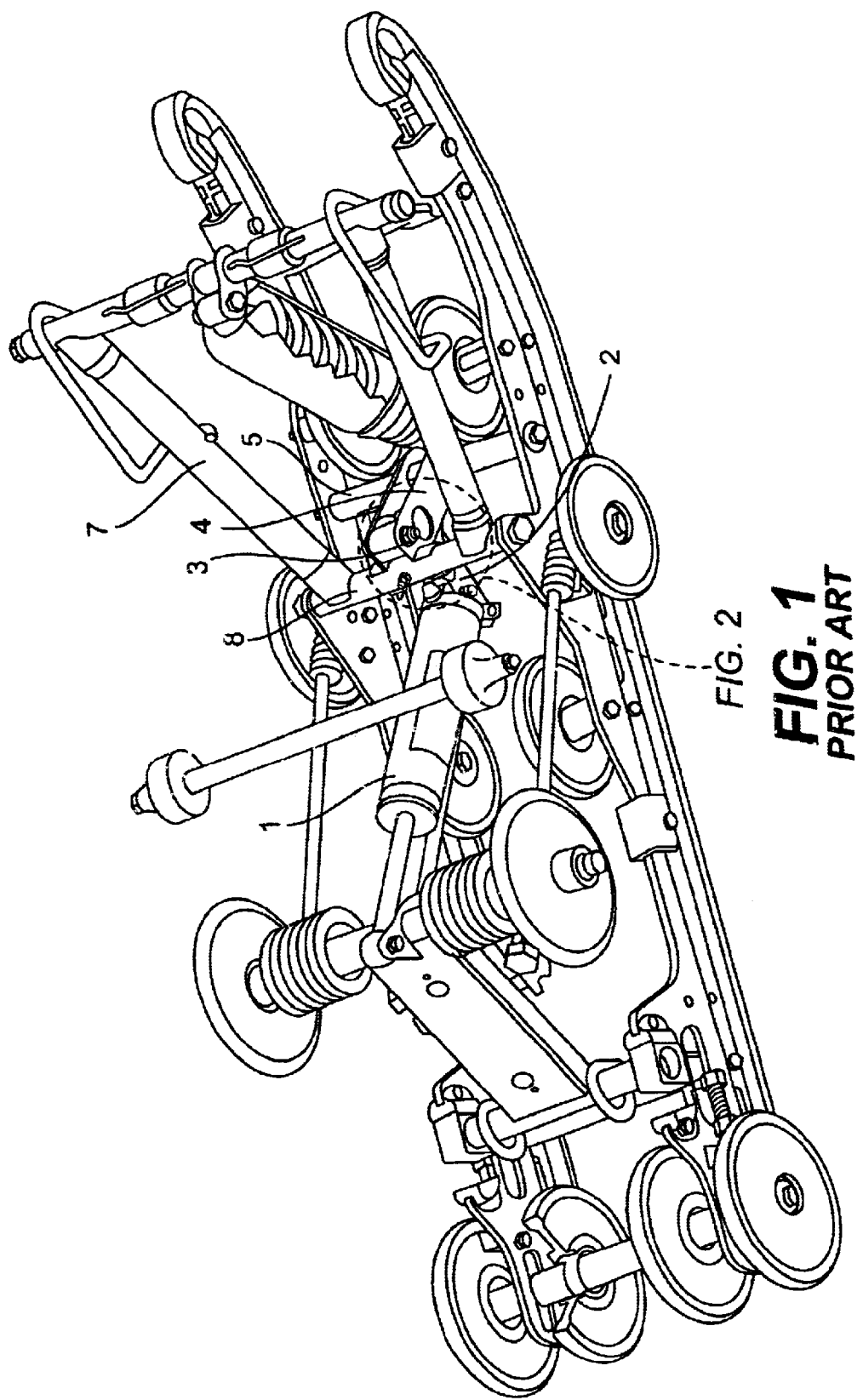
FIG. 1 shows a prior art suspension system which utilizes a rocker arm, a plate bracket, and a C-shaped support portion for additional support.
Figure 2:
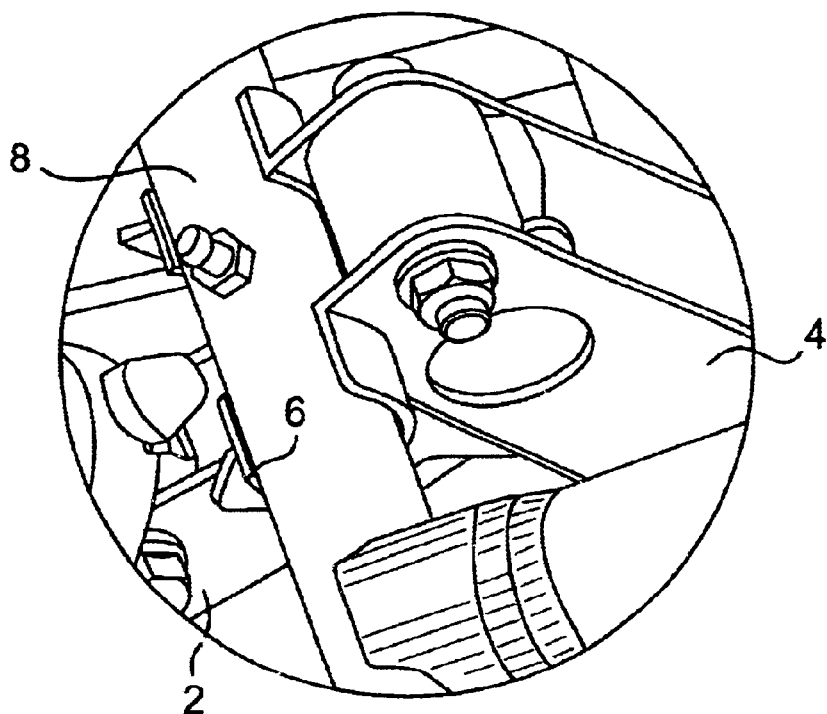
FIG. 2 illustrates an expanded view of a portion of the prior art system shown in FIG. 1.
Figure 3:
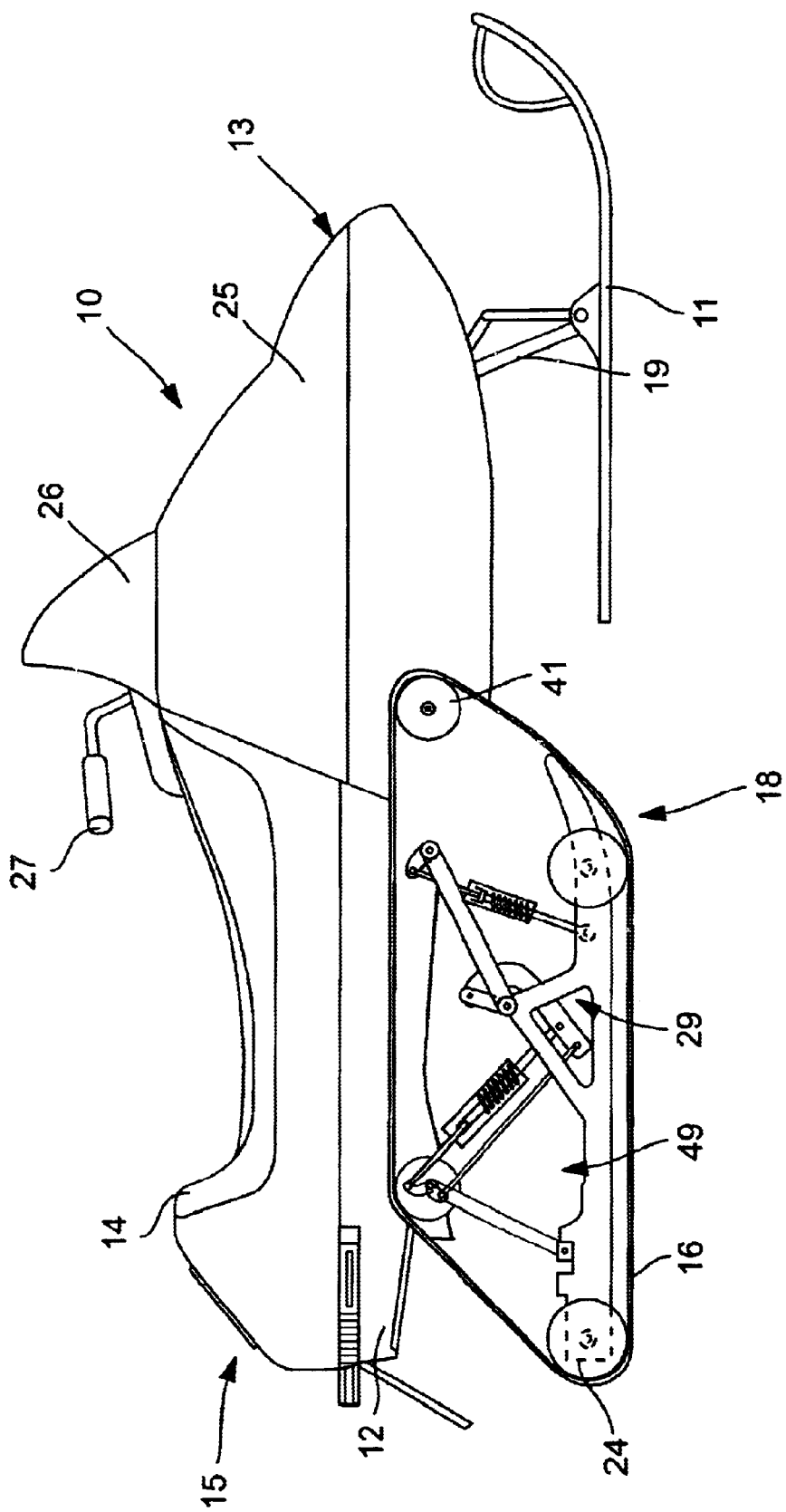
FIG. 3 shows an overall view of a snowmobile with its major components, including the preferred embodiment of the snowmobile suspension system of the present invention.

Referring to FIG. 3, a snowmobile 10 is generally shown having a forward end 13 and a rearward end 15 (that are defined consistently with the travel direction of the vehicle). Snowmobile 10 includes a body 17 (i.e., the exterior upper portions) and a chassis 12. While not shown in FIG. 3, an engine is carried by chassis 12 at its forward end. In addition, two skis 11 are attached to the forward end of chassis 12 through a front suspension 19. An endless, drive track 16 of the rear suspension 18 is disposed under chassis 12 and is connected operatively to the engine for propulsion of the vehicle. As is shown more clearly in FIG. 4, rear track support wheels 24 are supported on the slide rails 28 of a slide frame 20 by an axle shaft 32.

At the front of chassis 12, snowmobile 10 includes fairings 25 that enclose the engine to protect it and to provide a external shell that can be decorated so that the snowmobile is aesthetically pleasing. Typically fairings 25 comprise a hood and a bottom pad (neither of which have been individually identified in the Figures). A windshield 26 may be connected to fairings 25 near the forward end 13 of snowmobile 10. Windshield 26 acts as a windscreen to lessen the force of the air on a rider when snowmobile 10 is moving.

A seat 14 extends from rearward end 15 of snowmobile 10 to the fairings 25. A steering device 27, such as a handlebar, is positioned forward of the rider and behind the engine. Two footrests (not shown) are positioned on either side of seat 14 to accommodate the rider's feet.

Figure 4:
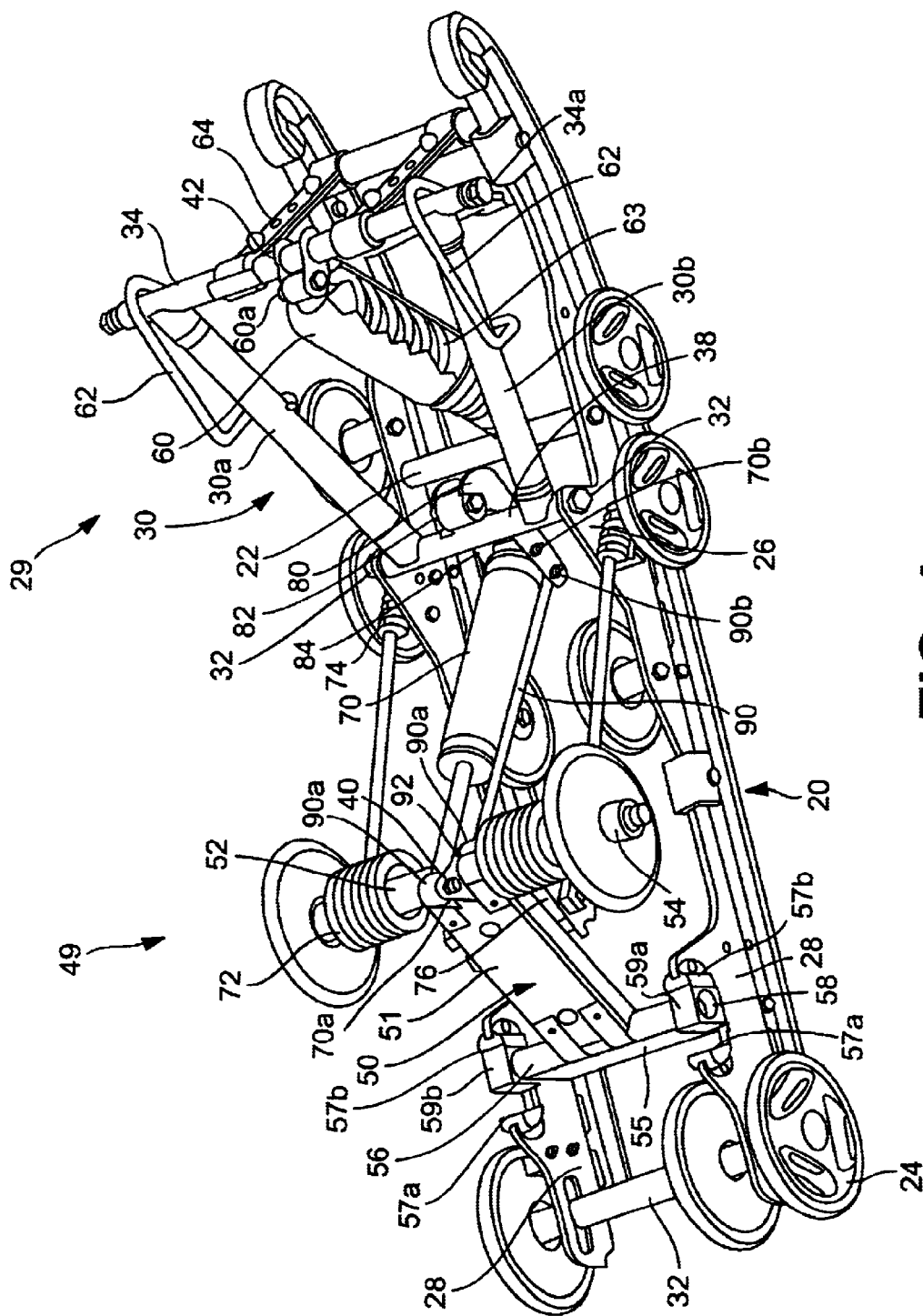
FIG. 4 shows a perspective view of the preferred embodiment of the snowmobile suspension system of the present invention.
Figure 5:
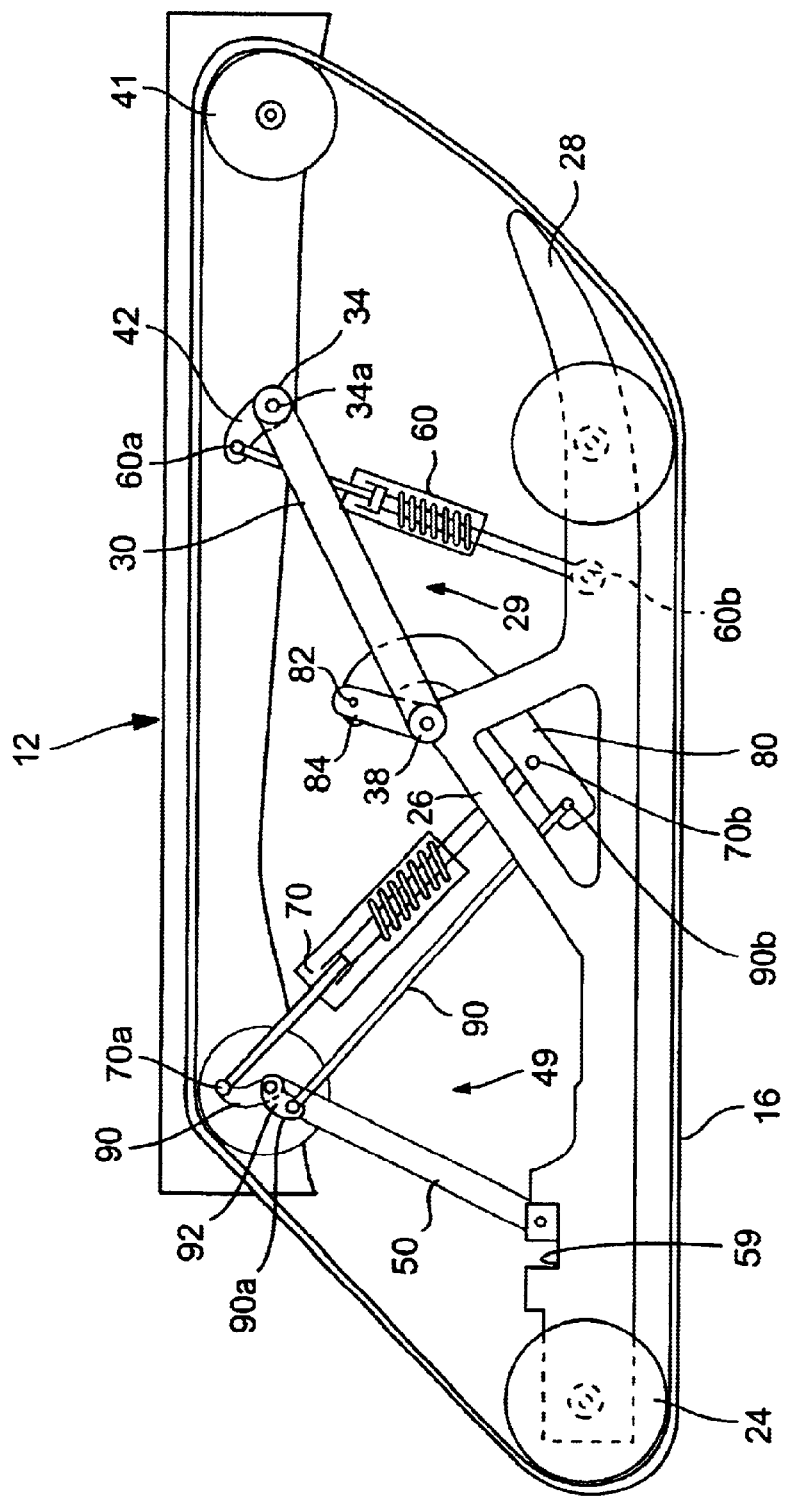
FIG. 5 shows a two dimensional view of FIG. 4.

Referring to FIGS. 4 and 5, the rear suspension system of the snowmobile 10 comprises a slide frame 20 that is connected to the chassis 12 through the front and rear suspension assemblies generally indicated as 29 and 49, respectively. Each of the front and rear suspension assemblies 29, 49 comprises, among other things, front and rear suspension arms 30 and 50, respectively, and front and rear shock absorbers 60 and 70, respectively. In the embodiment shown in FIG. 4, the rear shock absorber 70 is preferably of the piston-damper type, while the front shock absorber 60 of the coil-over piston-damper type. The slide frame 20 comprises two longitudinally extending transversely spaced apart slide rails 28 that are transversely interconnected by suitable cross structures to form a generally rigid structure. The lower surfaces of the slide rails 28 are coated in a known manner with a suitable low friction material such as nylon, Teflon®, and preferably UHMW (ultra high molecular weight polyethylene), for sliding contact with the drive track 16.

As shown in FIG. 4, front and rear suspension arms 30 and 50, respectively, interconnect the slide rails 28 with the chassis 12. The front suspension arm 30 is a trapezoidally-shaped structure that includes an upper tube portion 34 and a lower tube portion 38 that are connected by two tubes 30a and 30b. In the preferred embodiment, the components are all welded together to form an integral structure. The upper portion 34 of front suspension arm 30 is pivotally mounted on a first transverse shaft (not shown) that is fixedly attached to the chassis 12 by means of bolts 34a. Likewise, the lower tube portion 38 of front suspension arm 30 is pivotally mounted on a second transverse shaft (not shown) that is fixedly attached to the respective slide rails 28. Therefore, as the slide frame 20 displaces vertically, front suspension arm 30 is able to pivot about the first transverse shaft relative to the chassis 12 and simultaneously pivot about the second transverse shaft relative to the slide frame 20.

A front shock absorber 60 extends from the upper tube portion 34 of the front suspension arm 30 downwardly and rearwardly to fixedly connect to a lower transverse shaft 22, which is fixedly attached to slide rails 28 by bolts 60b, as shown in FIG. 5. The front shock absorber 60 is pivotally attached to a bracket arm 42 of the upper tube portion 34 by a bolt 60a. Bracket arm 42 is in turn fixedly attached to the upper tube portion 34 of front suspension arm 30.

The rear suspension assembly 49 comprises, among other things, a rear suspension arm 50, a rear shock absorber 70, and a location rod 90. The rear suspension arm 50 comprises a transverse rear upper tube that is pivotally mounted on a third transverse shaft (not shown), which is connected to the chassis 12 in known manner by a bolt 54, as shown in FIG. 4. Rear suspension arm 50 is a rectangularly-shaped structure that includes a transverse rear upper tube 52 and a transverse rear lower tube 56 that are connected at intermediate locations thereon by a metal plate 51. Although shown being connected by a metal plate 51, the transverse rear upper and lower tubes 52 and 56 can also be connected with at least one bar or tube, in which case the components of the rear suspension arm 50 would all be welded together to form a single unit.

The rear suspension arm 50 extends from the upper tube 52 downwardly and rearwardly to the lower tube 56. The transverse rear lower tube 56 is connected to a lower arm 55 which is in turn pivotally connected to the slide frame 20. The axial ends of the rear lower tube 56 have blocks 59a and 59b which are movable within the block stoppers 57a and 57b located on each slide rail 28.

A rear shock absorber 70 extends from the transverse rear upper tube downwardly and forwardly to pivotally attach to a rocker arm 80, which will be discussed below. The other end of the rear shock absorber 70 is pivotally interconnected to the chassis 12. That is, the upper end of rear shock absorber 70 is pivotally attached by a bolt 70a to a bracket arm 40, which in turn is fixedly attached to the transverse rear upper tube 52. Additionally, the rear suspension assembly 49 further comprises a location rod 90 that at one end (lower end) is pivotally attached to the lower end of rocker arm 80 by a bolt 90b. The location rod 90 runs adjacent the rear shock absorber 70 and is pivotally interconnected to the chassis 12. That is, the other end (upper end) of the location rod 90 is pivotally connected by a bolt 90a to bracket arm 92, which in turn is fixedly attached to the transverse rear upper tube 52. Therefore, as the slide frame 20 displaces vertically, rear suspension arm 50 is able to pivot about the third transverse shaft relative to the chassis 12.

Biasing elements are provided in both front and rear suspension assemblies 29 and 49, respectively, for urging the slide rails 28 away from the chassis 12. The biasing elements on the rear suspension assembly 49 preferably include a pair of torsion springs 72 around the transverse upper tube 52 of the rear suspension arm 50. One end 74 of each torsion spring 72 is connected to its corresponding slide rail 28 and the other end 76 of each is engaged with the rear suspension arm 50. The biasing element on the front suspension assembly 29 includes a helical spring 63 that is incorporated into the shock absorber 60. A pair of extension limiters, such as straps 64 shown in FIG. 4, is used to prevent over-extension of the slide rails 28 by the springs 63 and 72.

As mentioned earlier, the rear shock absorber 70 extends downwardly and forwardly to pivotally attach to rocker arm 80. Rocker arm 80 and its attachment to the front suspension arm 30 represents a major aspect of the preferred embodiment. Rocker arm 80 is made of two spaced apart flat plates which, when connected, together form one rocker arm 80. Of course, an integral cast, forged or manufactured rocker arm 80 can also be used. One end of rocker arm 80 is pivotally attached to bracket arm 84 by a bolt 82, and bracket arm 84 is in turn fixedly attached to the transverse lower tube portion 38 of the front suspension arm 30. Rocker arm 80 curls around and extends rearwardly beneath tube portion 38. Pivotally attached to the other end of rocker arm 80 are the lower end of the rear shock absorber 70 by a bolt 70b and the lower end of the location rod 90 by a bolt 90b. Bushings can be provided at one or more of the rocker arm/bracket arm, rocker arm/shock absorber and rocker arm/location rod pivot joints, as is known, to reduce friction between the components during operation. The positioning of bracket arm 84 is designed so that when the displacement of the slide frame 20 has reached its maximum compression point, i.e., bottomed out, the top of bracket arm 84 is close to or touches the underside of the snowmobile track 16. It can be appreciated that the orientation angle between the bracket arm 84 and the front suspension arm 30 remains fixed, and as the front suspension arm 30 moves up vertically due to a displacement of slide frame 20, bracket arm 84 likewise moves upward and also pivotally rotates about bolt 32.

With this structure, fewer parts are required to ensure sufficient suspension travel, thereby reducing the complexity and weight of the system, while providing greater flexibility in designing the suspension linkage systems. Additionally, the rocker arm 80 linkage arrangement of the illustrated embodiment eliminates the wear and stiction problems associated with the prior art.

While the invention has been described in connection with what is presently considered to be the most practical and preferred embodiments, it is to be understood that the invention is not to be limited to the disclosed embodiments and elements, but, on the contrary, is intended to cover various modifications, equivalent arrangements, and equivalent elements included within the spirit and scope of the appended claims.

What is claimed is:

1. A snowmobile suspension system comprising:

a slide frame for engagement with an endless track;

a first suspension arm having an upper portion adapted to be pivotally mounted relative to a chassis on a snowmobile and a lower portion adapted to be pivotally mounted relative to said slide frame;

a bracket arm having an end fixedly connected to said lower portion of said first suspension arm; and a rocker arm having an upper end pivotally connected to an other end of said bracket arm and a lower end supporting a lower end of a first shock absorber, said lower end of said first shock absorber being pivotally attached thereto, an upper end of said first shock absorber being pivotally interconnected to the chassis.

2. A snowmobile suspension system according to claim 1, wherein said rocker arm is constructed and arranged such that a lower end of said rocker arm is disposed beneath said lower portion of said first suspension arm.

3. A snowmobile suspension system according to claim 2, further comprising:

at least one location rod having an upper end adapted to be pivotally interconnected to the chassis and a lower end adapted to be pivotally attached to said lower end of said rocker arm.

4. A snowmobile suspension system according to claim 3, further comprising:

a second suspension arm adjacent said first suspension arm, said second suspension arm having an upper portion adapted to be pivotally mounted relative to said chassis and a lower portion adapted to be pivotally mounted relative to said slide frame.

5. A snowmobile suspension system according to claim 4, wherein said upper end of said at least one location rod is adapted to be pivotally connected to an end of a second bracket arm, an other end of said second bracket arm being fixedly attached to said upper portion of said second suspension arm.

6. A snowmobile suspension system according to claim 4, wherein said first shock absorber is to be downwardly and forwardly angled, and said upper end of said first shock abosrber is to be pivotally connected to said upper portion of said second suspension arm.

7. A snowmobile suspension according to claim 1, further comprising a second shock absorber having an upper end for pivotal connection to said upper portion of said first suspension arm and a lower end to be pivotally mounted relative to said slide frame.

8. A snowmobile suspension system according to claim 1, wherein said rocker arm comprises two spaced apart, substantially parallel flat plates.

9. A snowmobile, comprising:

a chassis;

an engine disposed on the chassis;

an endless track disposed below the chassis and connected operatively to the engine for propulsion of the snowmobile;

at least one ski disposed on the chassis;

a seat disposed on the chassis, suitable for a rider;

a steering device disposed on the chassis forward of the seat, the steering device being operatively connected to the at least one ski for steering the snowmobile;

a slide frame for engagement with the endless track;

a first suspension arm having an upper portion pivotally mounted relative to the chassis and a lower portion pivotally mounted relative to said slide frame;

a bracket arm having an end fixedly connected to said lower portion of said first suspension arm; and a rocker arm having an upper end pivotally connected to an other end of said bracket arm and a lower end supporting a lower end of a first shock absorber, said lower end of said first shock absorber being pivotally attached thereto, an upper end of said first shock absorber being pivotally interconnected to the chassis.

10. A snowmobile according to claim 9, wherein said rocker arm is constructed and arranged such that a lower end of said rocker arm is disposed beneath said lower portion of said first suspension arm.

11. A snowmobile according to claim 10, further comprising:

at least one location rod having an upper end pivotally interconnected to the chassis and a lower end pivotally connected to said lower end of said rocker arm.

12. A snowmobile according to claim 11, further comprising:

a second suspension arm adjacent said first suspension arm, said second suspension arm having an upper portion pivotally mounted relative to said chassis and a lower portion pivotally mounted relative to said slide frame.

13. A snowmobile according to claim 12, wherein said upper end of said at least one location rod is pivotally mounted to an end of a second bracket arm, an other end of said second bracket arm being fixedly attached to said upper portion of said second suspension arm.

14. A snowmobile according to claim 12, wherein said first shock absorber is downwardly and forwardly angled, and said upper end of said first shock absorber is pivotally connected to said upper portion of said second suspension arm.

15. A snowmobile according to claim 9, further comprising a second shock absorber having an upper end pivotally connected to said upper portion of said first suspension arm and a lower end pivotally mounted relative to said slide frame.

16. A snowmobile according to claim 9, wherein said rocker arm comprises two spaced apart, substantially parallel flat plates.

* * * * *